(12) United States Patent
Austin et al.

(10) Patent No.: US 7,689,043 B2
(45) Date of Patent: Mar. 30, 2010

(54) IMAGE RECOGNITION

(75) Inventors: James Austin, Driffield (GB); Nicholas Pears, York (GB); Thomas Heseltine, Bridgnorth (GB)

(73) Assignee: University of York (GB)

( * ) Notice: Subject to any disclaimer, the term of this patent is extended or adjusted under 35 U.S.C. 154(b) by 621 days.

(21) Appl. No.: 10/575,739

(22) PCT Filed: Oct. 11, 2004

(86) PCT No.: PCT/EP2004/052502

§ 371 (c)(1),
(2), (4) Date: Feb. 5, 2007

(87) PCT Pub. No.: WO2005/038700

PCT Pub. Date: Apr. 28, 2005

(65) Prior Publication Data

US 2007/0122007 A1    May 31, 2007

(30) Foreign Application Priority Data

Oct. 9, 2003  (GB) ................................. 0323662.7
Apr. 17, 2004 (GB) ................................. 0408570.0

(51) Int. Cl.
*G06K 9/00*    (2006.01)
*G06K 9/46*    (2006.01)

(52) U.S. Cl. ........................ 382/224; 382/118; 382/201

(58) Field of Classification Search ................. 382/118, 382/190, 195, 103, 104, 170, 206, 155, 159, 382/115, 225, 117, 201, 224, 276; 704/251, 704/E15.042, 521; 348/77, 169; 385/116; 434/43; 345/419, 420, 49, 679
See application file for complete search history.

(56) References Cited

U.S. PATENT DOCUMENTS

| | | | |
|---|---|---|---|
| 6,301,370 B1 * | 10/2001 | Steffens et al. ............... | 382/103 |
| 6,556,196 B1 * | 4/2003 | Blanz et al. .................. | 345/419 |
| 6,801,641 B2 * | 10/2004 | Eraslan ........................ | 382/118 |
| 7,054,468 B2 * | 5/2006 | Yang ........................... | 382/118 |
| 7,113,641 B1 * | 9/2006 | Eckes et al. .................. | 382/218 |
| 7,352,881 B2 * | 4/2008 | Lestideau .................... | 382/103 |
| 2003/0086593 A1 * | 5/2003 | Liu et al. ..................... | 382/118 |

* cited by examiner

*Primary Examiner*—Sheela C Chawan
(74) *Attorney, Agent, or Firm*—Barnes & Thornburg LLP

(57) ABSTRACT

A camera A produces a 3D natural image B which is re-oriented and repositioned at N to predetermined parameters. Different processes C, D, E extract different features from the image to provide different processed images. The data space occupied by the processed images is reduced, for example by Principle Component Analysis, at F, G, H and the reduced processed images are combined at O to provide an image key I representative of the image B. The image key I is compared at J with stored image keys L of known images, and the output comparison is sorted at K to produce a final list M of potential matches. In a verification process, just a single image key L may be compared. The processed images at C, D, E may alternatively be combined prior to a single subspace reduction and/or optimisation method. 2D data may be combined with or used instead of the 3D data.

41 Claims, 13 Drawing Sheets

Identification System

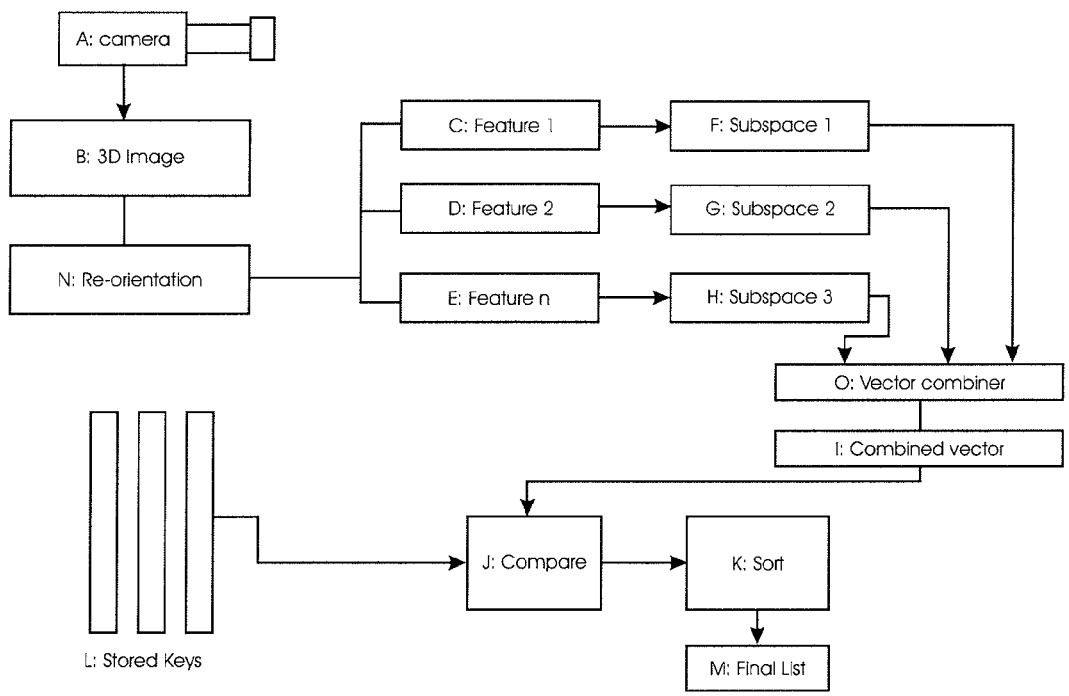
Fig 1: Identification System
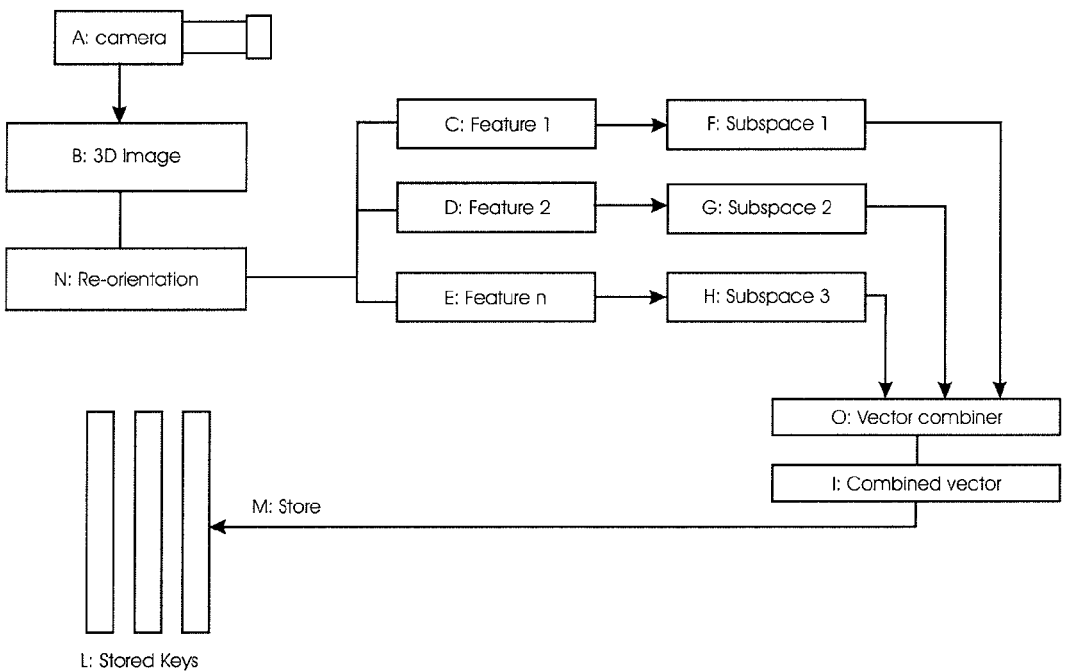
Fig 2: Training System

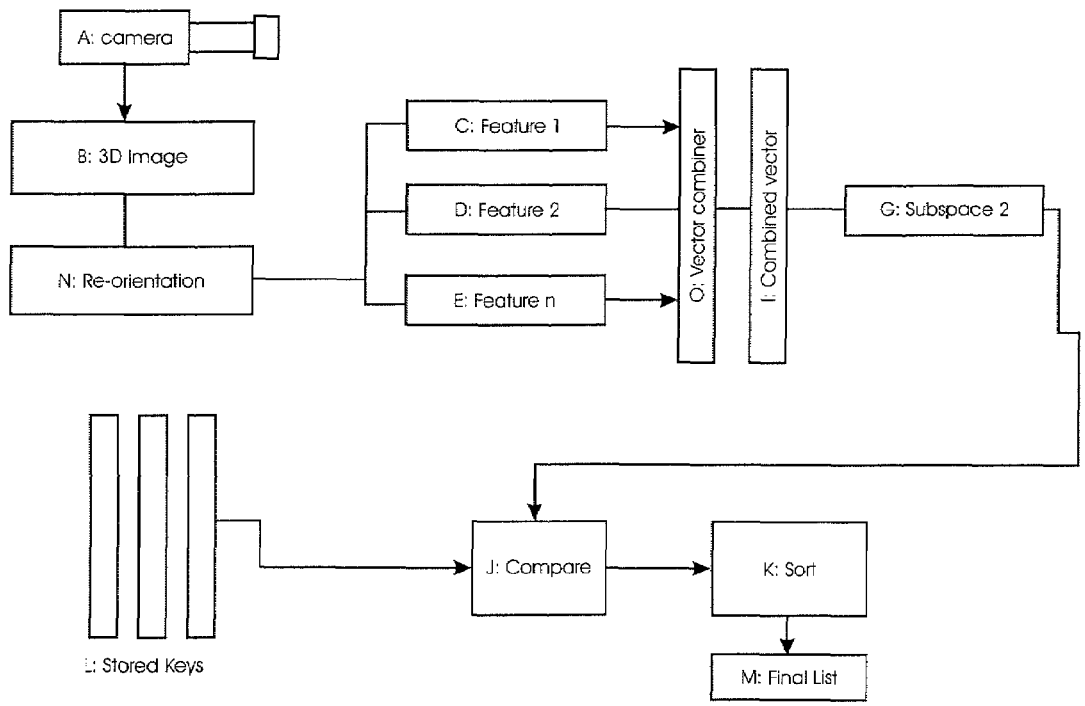
Fig 3: Identification System using
Combiner before the subspace method
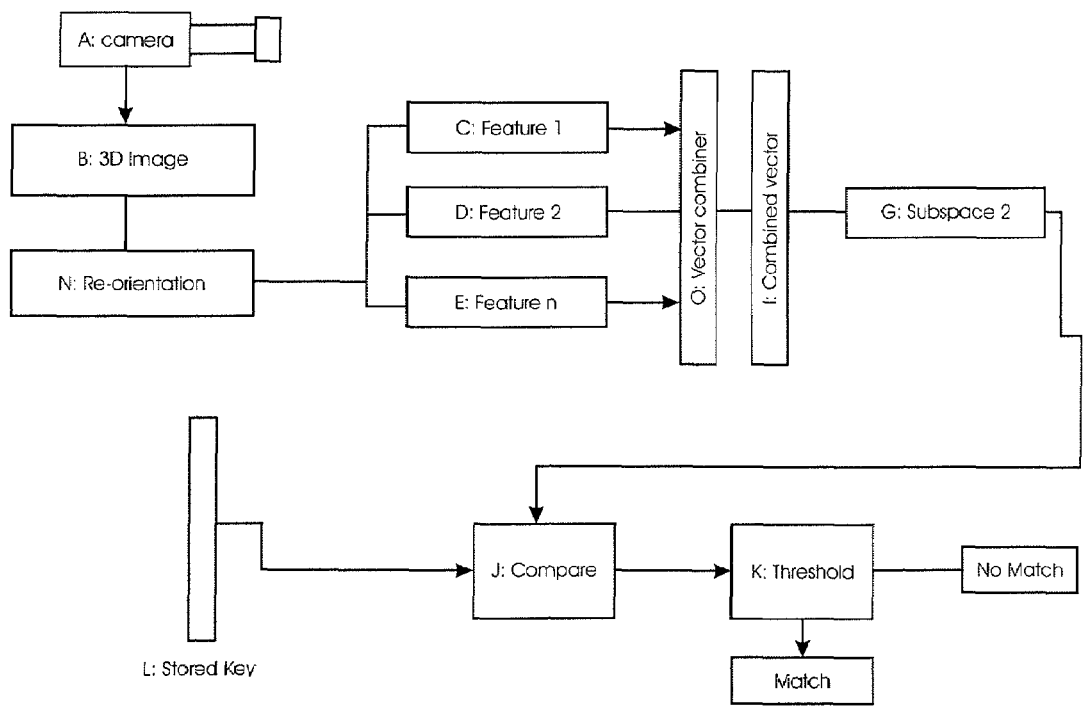
Fig 4: Verification System using
Combiner before the subspace method

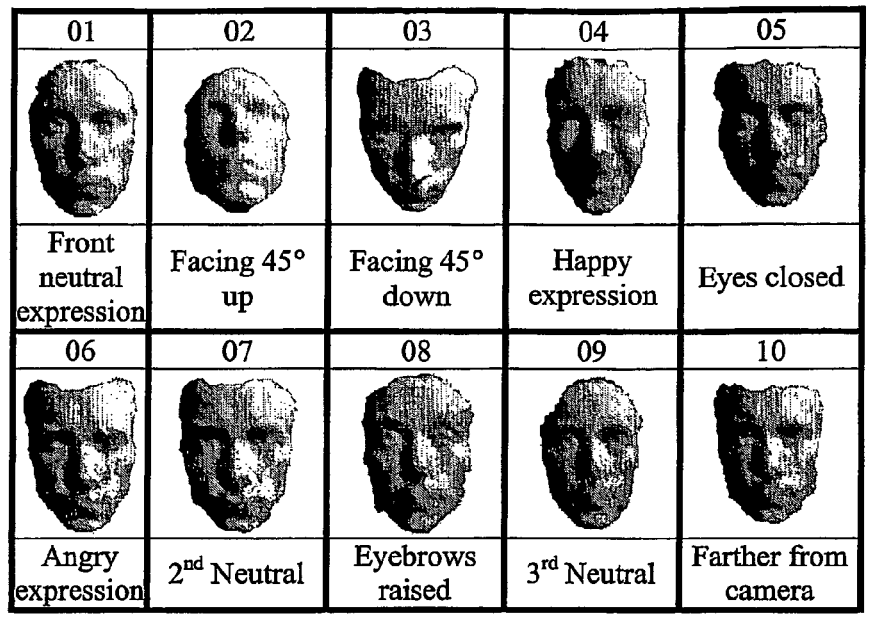
Fig. 5. Example face models taken from a 3D face database
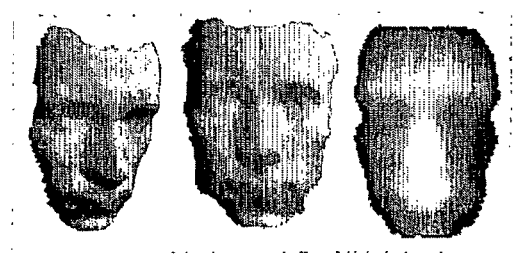
Fig. 6. Orientation of a raw 3D face model (*left*) to a frontal pose (*middle*) and facial surface depth map (*right*)

Fig. 7. Average depth map (*left most*) and first eight eigensurfaces
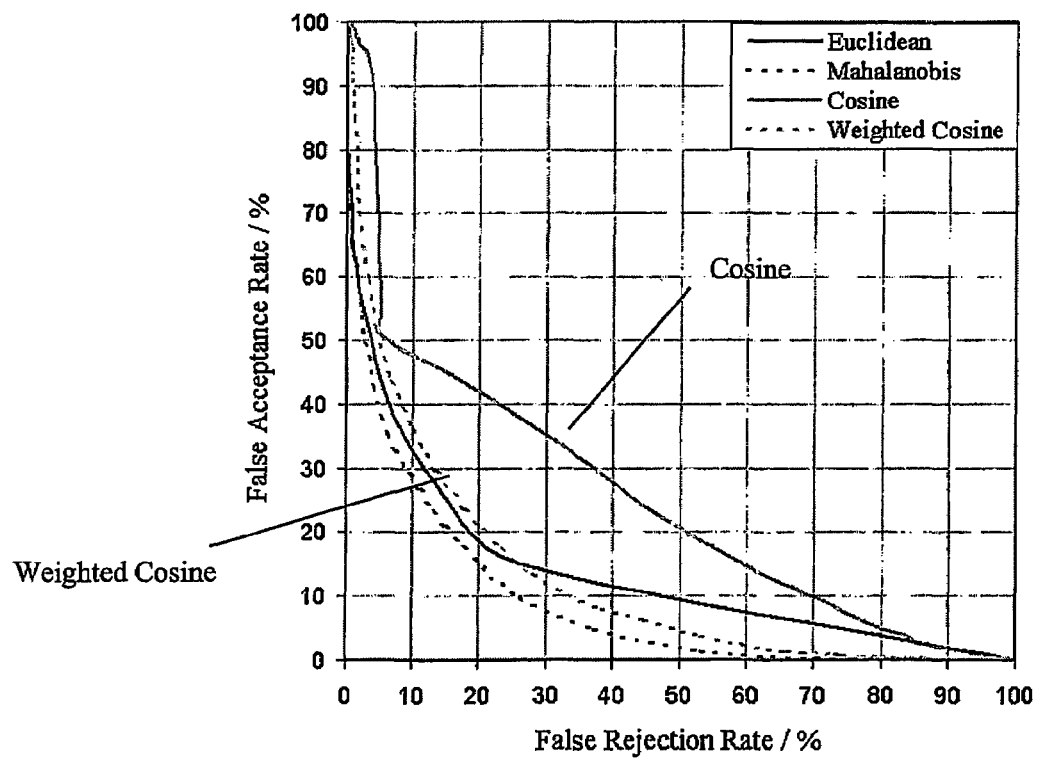
Fig. 8. Results from previous 3D face recognition systems using facial surface depth maps and a range of distance metrics

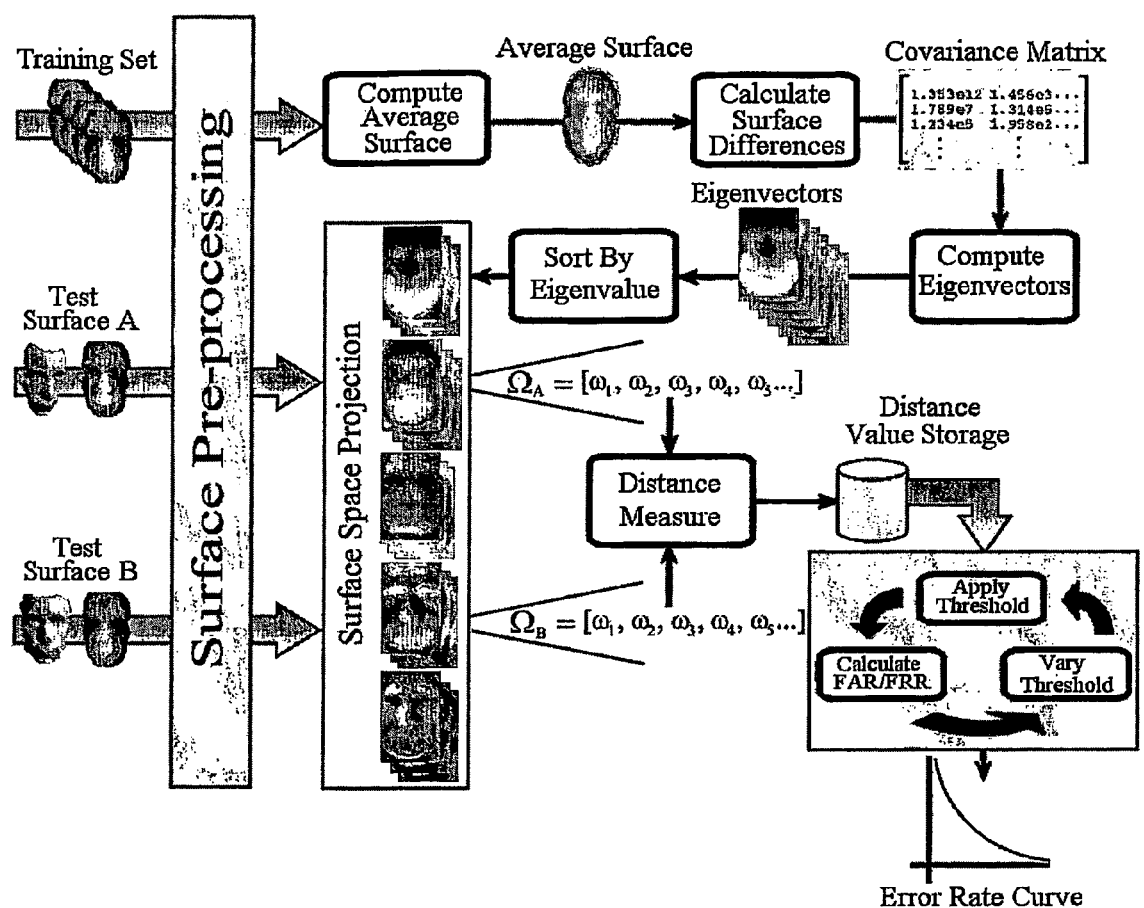
Fig. 9. Experimental framework for evaluating verification systems

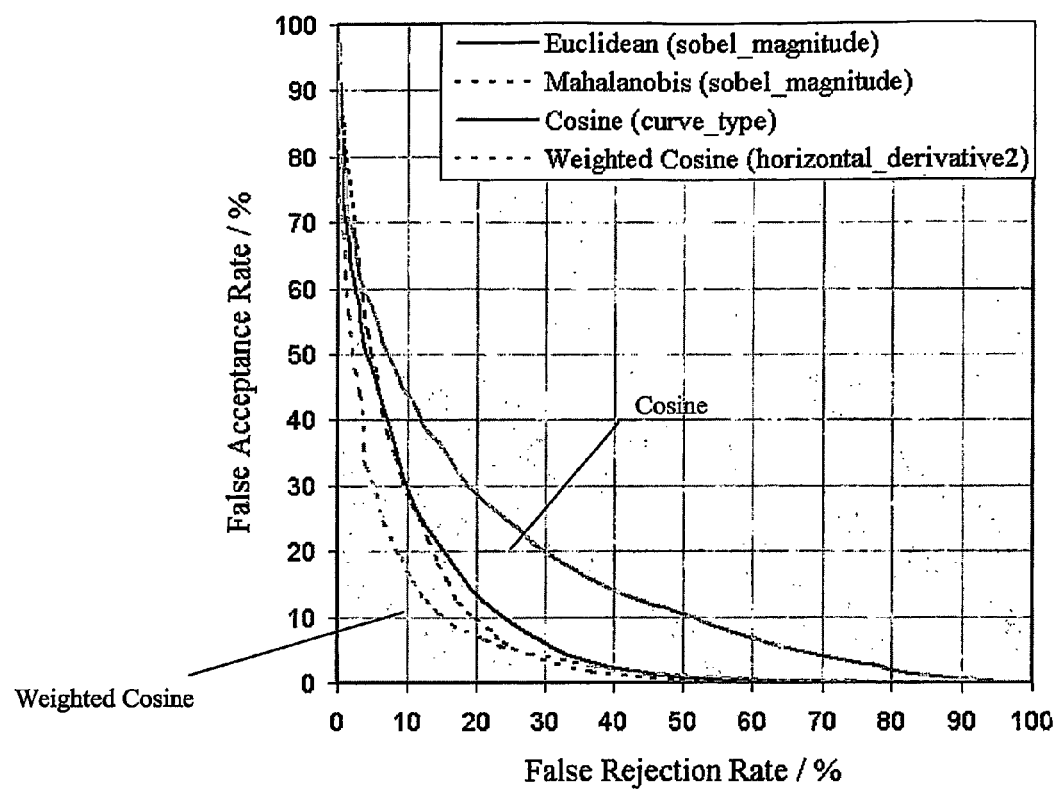
Fig. 10. Error rates of 3D face recognition systems using optimum surface representations and distance metrics.

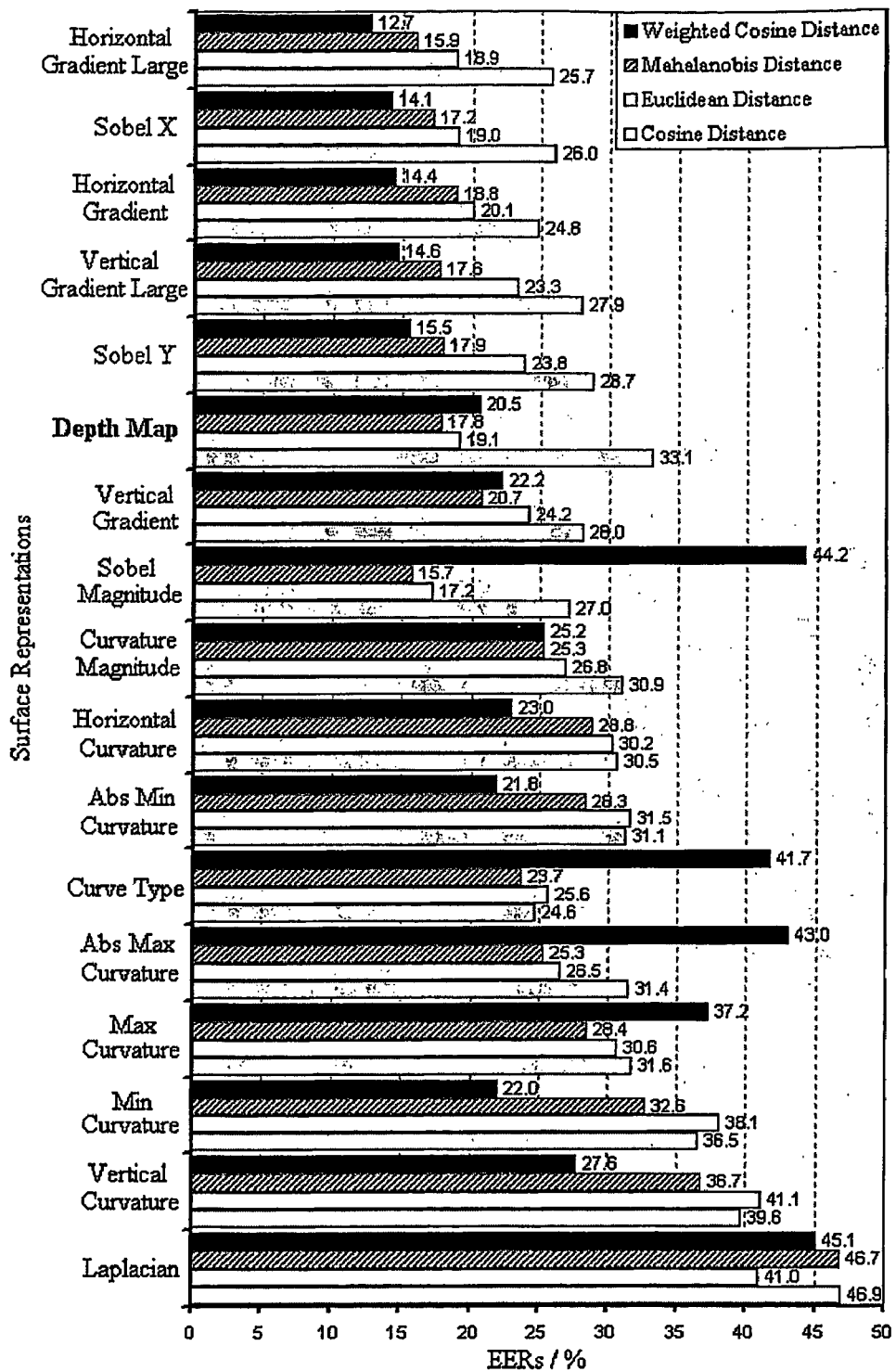
Fig. 11. Equal error rates of 3D face recognition systems using a variety of surface representations and distance metrics

| Horizontal Gradient | Vertical Gradient | Horizontal Gradient Large | Vertical Gradient Large |
|---|---|---|---|
|  -1 1 |  -1 / 1 |  -1 0 0 0 1 |  -1 / 0 / 0 / 0 / 1 |
| Applies the 2x1 kernel to compute the horizontal derivative | Applies the 1x2 kernel to compute the vertical derivative | Horizontal gradient calculated over a greater horizontal distance | Vertical gradient calculated over a greater vertical distance |
| Laplacian | Sobel X | Sobel Y | Sobel Magnitude |
|  0 1 0 / 1 -4 1 / 0 1 0 |  -1 0 1 / -2 0 2 / -1 0 1 |  1 2 1 / 0 0 0 / -1 -2 -1 |  |
| An isotropic measure of the second spatial derivative | Application of the sobel derivative filter in the horizontal direction | Application of the sobel derivative filter in the vertical direction | The magnitude of the X and Y sobel derivatives |
| Horizontal Curvature | Vertical Curvature | Curvature Magnitude | Curve Type |
|  |  |  |  |
| Applies the sobel X kernel twice to calculate the second horizontal derivative | Applies the sobel Y kernel twice to calculate the second vertical derivative | The magnitude of the vertical and horizontal curvatures | Segmentation of the surface into 8 discreet curvature types |
| Min Curvature | Max Curvature | Abs Min Curvature | Abs Max Curvature |
|  |  |  |  |
| The minimum of the horizontal and vertical curvature values | The maximum of the horizontal and vertical curvature values | The minimum of the absolute horizontal and vertical curvatures | The maximum of the absolute horizontal and vertical curvatures |

Figure 12. Brief descriptions of surface representations with the convolution kernels used.

| Horizontal Derivative | Vertical Derivative | Horizontal Derivative 2 | Vertical Derivative 2 |
|---|---|---|---|
|  -1 1 |  -1 / 1 |  -1 0 0 0 1 |  -1 / 0 / 0 / 0 / 1 |
| Applies the 2x1 kernel to compute the horizontal derivative | Applies the 1x2 kernel to compute the vertical derivative | Horizontal gradient over a greater horizontal distance | Vertical gradient over a greater vertical distance |
| Laplacian | Sobel X | Sobel Y | Sobel Magnitude |
|  0 1 0 / 1 -4 1 / 0 1 0 |  -1 0 1 / -2 0 2 / -1 0 1 |  1 2 1 / 0 0 0 / -1 -2 -1 |  |
| An isotropic measure of the second spatial derivative | Application of the horizontal sobel derivative filter | Application of the vertical sobel derivative filter | The magnitude of Sobel X and Y combined. |
| Horizontal Curvature | Vertical Curvature | Curvature Magnitude | Curve Type |
|  |  |  |  |
| Applies sobel X twice to calculate the second horizontal derivative | Applies sobel Y twice to calculate the second vertical derivative | The magnitude of the vertical and horizontal curvatures | Segmentation of the surface into 8 discreet curvature types |
| Min Curvature | Max Curvature | Abs Min Curvature | Abs Max Curvature |
|  |  | | |
| The minimum of the horizontal and vertical curvature values | The maximum of the horizontal and vertical curvature values | The minimum of the absolute horizontal and vertical curvatures | The maximum of the absolute horizontal and vertical curvatures |

IMAGE RECOGNITION

BACKGROUND OF THE INVENTION

1. Field of the Invention

This invention relates to the recognition of images and is concerned with the recognition of both natural and synthetic images.

By "natural image" is meant an image of an object that occurs naturally—for example, an optical image such as a photograph, as well as images of other wavelengths—such as x-ray and infra-red, by way of example. The natural image may be recorded and/or subsequently processed by digital means, but is in contrast to an image—or image data—that is generated or synthesised by computer or other artificial means.

2. Description of Related Art

The recognition of natural images can be desirable for many reasons. For example, distinctive landscapes and buildings can be recognised, to assist in the identification of geographical locations. The recognition of human faces can be useful for identification and security purposes. The recognition of valuable animals such as racehorses may be very useful for identification purposes.

In this specification, we present in preferred embodiments of the invention a new approach to face recognition using a variety of three-dimensional facial surface representations generated from a University of York (UofY)/Cybula 3D Face Database.

Despite significant advances in face recognition technology, it has yet to achieve the levels of accuracy required for many commercial and industrial applications. Although some face recognition systems proclaim extremely low error rates in the test environment, these figures often increase when exposed to a real world scenario. The reasons for these high error rates stem from a number of well-known sub-problems that have never been fully solved. Face recognition systems are highly sensitive to the environmental circumstances under which images are captured. Variation in lighting conditions, facial expression and orientation can all significantly increase error rates, making it necessary to maintain consistent image capture conditions between query and gallery images for the system to function adequately. However, this approach eliminates some of the key advantages offered by face recognition: a passive biometric in the sense that it does not require subject co-operation.

SMMARY OF THE INVENTION

Preferred embodiments of the present invention aim to provide methods of face recognition that are improved in the foregoing respects.

According to one aspect of the present invention, there is provided a method of recognising an image, comprising the steps of:
 a. processing the image to provide an image set containing a plurality of different processed images;
 b. combining the processed images in the image set;
 c. transforming the data space occupied by the processed images in the image set;
 d. generating, from the image-set represented in the transformed data space, an image key representative of the image; and
 e. comparing the image key with at least one previously stored image key of a known image.

Step a. may include extracting image features including at least one of edges, lines, wavelets, gradient components, curvature components and colour components.

Step b. may be carried out prior to step c. Alternatively, step c. may be carried out prior to step b.

Step e. may comprise comparing the image key with just one previously stored image key, to verify the identity of the image.

Step e. may comprise comparing the image key with a plurality of previously stored image keys, to identify the image.

A method as above may further comprise the step of sorting the results of the comparison in step e. to produce a list of potential matches with previously stored image keys.

Step e. may be carried out using a Euclidean distance metric (the L2 norm), mahalanobis distance metric or a cosine distance metric.

A method as above may include the step prior to step a. of rotating and/or positioning the image to a predetermined orientation and/or position and/or depth normalisation.

A method as above may include the step prior to step b. of normalising data prior to combination.

Said image may be obtained from a camera.

Said image may comprise 3D data and/or 2D data.

Said image may comprise a registered 2D-3D image pair.

Step c. may be carried out by a Principal Component Analysis method.

Step c. may be carried out by Fisher's Linear Discriminant Analysis method.

Said image may be an image of a face.

Said image may be an image of a human face.

Said image may be a natural image.

Said image set may include the original image.

In another aspect, the invention provides apparatus for recognising an image, the apparatus comprising:
 a. processing means arranged to process the image to provide a plurality of different processed images;
 b. combining means arranged to combine the processed images;
 c. reducing means arranged to reduce the data space occupied by the processed images;
 d. generating means arranged to generate from the combined and reduced processed images an image key representative of the image; and
 e. comparison means arranged to compare the image key with at least one previously stored image key of a known image.

Such an apparatus may be arranged to perform a method according to any of the preceding aspects of the invention.

In another aspect, the invention provides a method of recognising a three-dimensional image, comprising the steps of:
 a. transforming the data space occupied by the image using Fisher's Linear Discriminate Analysis;
 b. generating, from the transformed data space, an image key representative of the image; and
 c. comparing the image key with at least one previously stored image key of a known image.

In another aspect, the invention provides apparatus for recognising a three-dimensional image, the apparatus comprising:
 a. means for transforming the data space occupied by the image using Fisher's Linear Discriminant Analysis;
 b. means for generating, from the transformed data space, an image key representative of the image; and
 c. means for comparing the image key with at least one previously stored image key of a known image.

In this specification, a "2D image" means a conventional digital image, which consists of a two-dimensional (2D) array of pixel values. This may be either a greyscale image, where the pixel values refer to intensity (brightness), or the pixels may have both colour and intensity associated with them. In this case, several values are associated with each pixel, most typically three base colour values such as red (R), green (G) and blue (B), which are often referred to as RGB colour values of the pixel, although many other multi-valued representations of the colour and intensity of a pixel are possible.

In this specification, a "3D image" means any three-dimensional (3D) representation of a face or, more generally, another object. For example, this could be a 3D point cloud, a 3D mesh, or a 3D surface representation. In preferred implementations, the 3D image used will be a depth map, which has the same rectangular array, pixelated structure as a standard 2D image, except that the pixel values now represent depths of the face (object) surface relative to some reference plane.

In this specification, a "registered 2D-3D image pair" means a 2D and 3D image of the same person's face (or other object) where we know the correspondence between the two images, i.e. we know which points in the 2D image correspond to which points in the 3D image in the sense that they represent properties of the same surface points on the actual facial (or object) surface.

BRIEF DESCRIPTION OF THE SEVERAL VIEWS OF THE DRAWINGS

For a better understanding of the invention, and to show how embodiments of the same may be carried into effect, reference will now be made, by way of example, to the accompanying diagrammatic drawings, in which:

FIG. 1 is a flowchart to illustrate one example of a method of image recognition;

FIG. 2 is a flowchart similar to FIG. 1, to illustrate a training mode;

FIG. 3 is a flowchart to illustrate a variant of the method illustrated in FIG. 1;

FIG. 4 is a flowchart similar to that of FIG. 3, but illustrating a variation in which a particular match is sought;

FIG. 5 shows examples of face models taken from a 3D face database;

FIG. 6 shows orientation of a raw 3D face model (left) to a frontal pose (middle) and facial surface depth map (right);

FIG. 7 shows an average depth map (left most) and first eight eigensurfaces;

FIG. 8 is a graph showing false acceptance rate and false rejection rate for typical 3D face recognition systems using facial surface depth maps and a range of distance metrics;

FIG. 9 is a diagram of verification test procedure;

FIG. 10 is a graph showing false acceptance rate and false rejection rate for 3D face recognition systems using optimum surface representations and distance metrics;

FIG. 11 is a chart to show Equal error rates of 3D face recognition systems using a variety of surface representations and distance metrics; and FIG. 12 shows brief descriptions of surface representations with convolution kernels used;

FIG. 13 is a table of surface representations;

FIG. 16 is a table showing dimensions selected from surface spaces for inclusion in two combined systems using Euclidean distance and cosine distance metrics.

DETAILED DESCRIPTION OF THE INVENTION

Figure 14:
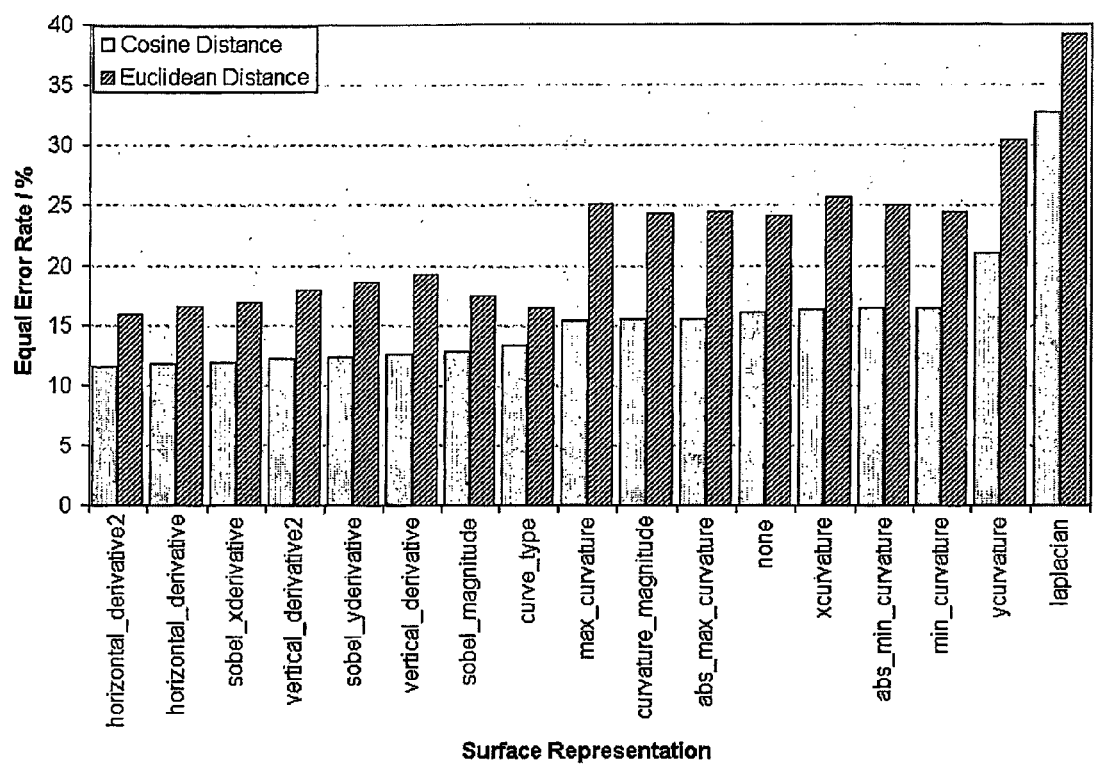
FIG. 14 is a graph to show Equal Error Rates for different surface representations.

In the figures, like references denote like or corresponding parts.

In FIG. 1, a camera A captures a 3D image of a face and transmits it to a processor B which generates a 3D depth image, together with a 2D texture image (colour or greyscale data). Preferably, the 3D and 2D data are registered with one another. At N, the image is rotated, scaled and repositioned—if necessary—to ensure that it faces front and is centred in the image space. (In general, it may be rotated to any predetermined angle of rotation, scaled at any predetermined depth and positioned at any predetermined position in the image space.)

At C, D and E, the image is processed in three respective, different ways to extract features from the face. Many different image processes may be adopted—e.g. edges, lines, wavelets, etc. Many image processes will be known to the skilled reader. One of the processes C, D and E could be a null process—i.e. the raw image is passed through from N. The feature extraction or analysis processes produce a number of new processed images that may be the same size as the input or may be of different sizes—typically, they may be larger. Thus, at this point, there is a large amount of data, and it is desirable to reduce this.

At F, G and H, a transformation step is performed in which the processed image outputs from C, D and E are analysed to extract important data and reject data of low or no significance. Many methods of analysis will be known to the skilled reader and include, for example, Principle Component Analysis (PCA), Principle Curves, Information Maximisation, etc. The end result is to produce data of a smaller size than the input, occupying a subspace—preferably an optimum subspace—of the original set of data. The information extraction method is applied to every image output from C, D and E.

The outputs of processes F, G and H comprise a set of vectors, which are combined at O to produce a single vector called the image key I. Many different combination methods can be used—for example, simple concatenation (end-to-end), superimposition, etc. The vectors may be normalised before input at O, so that they all lie in the same range. Significant bits of the vectors from F, G and H may be combined, and insignificant bits discarded.

The image key from I is compared at J with prior stored keys at K, to produce a measure of similarity with the stored keys, by means of a metric. Many suitable metrics will be known to the skilled reader, such as Euclidean, Manhattan, etc.

The comparison results from J are sorted at K and output as a final list at M.

FIG. 2 illustrates how keys are stored at L. In this case, a known image is captured by the camera A, and the process steps as described above are repeated until step I, where the image key of the known image is stored at L.

An alternative to the methods of FIGS. 1 and 2 is shown in FIG. 3, where the vectors are combined after the feature extraction stage C, D, E to produce a single vector at I, which then undergoes transformation in a single information extraction step (subspace method) at G to produce the image key, which is compared at J as before.

FIG. 4 illustrates another variation where the key image is compared at J with just a single stored image, and a subsequent threshold step at K indicates either a Match or No Match as output.

FIG. 4 shows combination of the vectors O, I prior to the subspace transformation process G. However, it will be appreciated that, alternatively, subspace processes such as F, G and H may be applied prior to vector combination transformation O, I, as in FIG. 1.

In general, embodiments of the invention may process 3D image data, 2D image data or both. Although a camera A is shown in FIGS. 1 to 4, the image(s) may come from any suitable source.

Referring now to FIGS. 5 to 12, we consider embodiments in which, by applying Principal Component Analysis (PCA) to three-dimensional surface structure, we show that high levels of accuracy can be achieved when performing recognition on a large database of 3D face models, captured under conditions that present typical difficulties to the more conventional two-dimensional approaches. Results are presented as false acceptance rates and false rejection rates, taking the equal error rate as a single comparative value. We identify the most effective surface representations and distance metrics to be used in such application areas as security, surveillance, data compression and archive searching.

In these embodiments, we include the use of 3D face models that eliminate some of the problems commonly associated with face recognition. By relying purely on geometric shape, rather than the colour and texture information available in two-dimensional images, we render the system invariant to lighting conditions, at the expense of losing the distinguishing features only available in colour and texture data. In addition, the ability to rotate a facial structure in three-dimensional space allows for compensation of variations in pose, aiding those methods requiring alignment prior to recognition.

It is to be appreciated, nevertheless, that 2D data could be used in addition to 3D data—or as an alternative.

Here we use facial surface data, taken from 3D face models, as a substitute for the more familiar two-dimensional images. We take a well-known method of face recognition, namely the eigenface approach described by Turk and Pentland [Turk, M., Pentland, A.: *Eigenfaces for Recognition. Journal of Cognitive Neuroscience*, Vol. 3, (1991) 72-86], [Turk, M., Pentland, A.: *Face Recognition Using Eigenfaces. In Proc. IEEE Conf. on Computer Vision and Pattern Recognition*, (1991) 586-591] and adapt it for use on the new three-dimensional data. We identify the most effective methods of recognising faces using three-dimensional surface structure.

In order to test this method of face recognition, we have used a large database of 3D face models. However, until recently, methods of 3D model generation have usually employed the use of laser scanning equipment. Such systems (although highly accurate) are often slow, requiring the subject to remain perfectly still. Stereo vision techniques are able to capture at a faster rate without using lasers, but feature correlation requires regions of contrast and stable local texture; something that cheeks and forehead distinctly lack. For these reasons, three-dimensional face recognition has remained relatively unexplored, when compared to the wealth of research focusing on two-dimensional face recognition. Although some investigations have experimented with 3D data [Beumier, C., Acheroy, M: *Automatic 3D Face Authentication. Image and Vision Computing*, Vol. 18, No. 4, (2000) 315-321], [Beumier, C., Acheroy, M.: *Automatic Face Verification from 3D And Grey Level Clues.* 11th *Portuguese Conference on Pattern Recognition*, 2000], [Gordon, G.: *Face Recognition Based on Depth and Curvature Features. In Proc. of the IEEE Computer Society Conference on Computer Vision and Pattern Recognition*, Champaign, Ill. (1992) 108-110], [Chua, C., Han, F., Ho, T: 3*D Human Face Recognition Using Point Signature. Proc. Fourth IEEE International Conference on Automatic Face and Gesture Recognition*, (2000) 233-8], they have had to rely on small tests sets of 3D face models or used genetic face models to enhance two-dimensional images prior to recognition [Zhao, W., Chellaa, R.: 3*D Model Enhanced Face Recognition. In Proc. Of the International Conference on Image Processing*, Vancouver (2000)], [Romdhani, S., Blanz, V., Vetter, T.: *Face Identification by Fitting a* 3*D Morphable Model using Linear Shape and Texture Error Functions. The European Conference on Computer Vision* (2002)], [Blanz, V., Romdhani, S., Vetter, T.: *Face Identification across Different Poses and Illuminations with a* 3*D Morphable Model. In Proc. of the* 5$^{th}$ *IEEE Conference on AFGR* (2002)]. However, this research demonstrates that the use of three-dimensional information has the potential to improve face recognition well beyond the current state of the art. With the emergence of new three-dimensional capture equipment, population of a large 3D face database has now become viable and being undertaken at the UofY/Cybula as part of a project facilitating research into three-dimensional face recognition technology.

Previous research has explored the possibilities offered by three-dimensional geometric structure to perform face recognition. To date, the research has focused on two-dimensional images, although some have attempted to use a-ptiori knowledge of facial structure to enhance these existing two-dimensional approaches. For example, Zhao and Chellappa [supra] use a generic 3D face model to normalise facial orientation and lighting direction in two-dimensional images. Using estimations of light source direction and pose, the 3D face model is aligned with the two-dimensional face image and used to project a prototype image of the frontal pose equivalent, prior to recognition by Linear Discriminant Analysis. Though this approach, recognition accuracy on the test set is increased from approximately 81% (correct match within rank of 25) to 100%. Similar results are witnessed in the Face Recognition Vendor Test (FRVT) [Phillips, P. J., Grother, P., Micheals, R. J., Blackburn, D. M., Tabassi, E., Bone, J. M: FRVT 2002: *Overview and Summary*. http.//www.frvt.org/FRVT2002/documents.htm, March (2003)], showing that pose correction using Romdhani, Blanz and Vetter's 3D morphable model technique [supra] reduces error rates when applied to the FERET database [Phillips, P. J., Wechsler, H., Huang J., Rauss, P.: *The FERET database and evaluation procedure for face recognition algorithms Image and Vision Computing. J, Vol. 16, No. 5*, (1998) 295-306].

Blanz, Romdhani and Vetter [supra] take a comparable approach, using a 3D morphable face model to aid in identification of 2D face images. Beginning with an initial estimate of lighting direction and face shape, Romdhani et al iteratively alters shape and texture parameters of the morphable face model, minimising difference to the two-dimensional image. These parameters are then taken as features for identification.

Although the methods discussed show that knowledge of three-dimensional face shape can improve two-dimensional face recognition systems by improving normalisation, none of the methods mentioned so far use actual geometric structure to perform recognition. Whereas Beumier and Acheroy [supra] make direct use of such information, generating 3D face models using an approach based on structured light deformation, Beumier and Acheroy test various methods of matching 3D face models, few of which were successful. Curvature analysis proved ineffective, and feature extraction was not robust enough to provide accurate recognition. However, Beumier and Acheroy were able to achieve reasonable error rates using curvature values of vertical surface profiles.

Verification tests carried out on a database of 30 people produced equal error rates between 7.25% and 9% on the automatically aligned surfaces and between 6.25% and 9.5% when manual alignment was used.

Chua et al [supra] take a different approach, applying non-rigid surface recognition techniques to the face structure. An attempt is made to identify and extract rigid areas of facial surfaces, creating a system invariant to facial expression. The characteristic used to identify these rigid areas and ultimately distinguish between faces is the point signature, which describes depth values surrounding local regions of specific points on the facial surface. The similarity of two face models is computed by identifying and comparing a set of unique point signatures for each face. Identification tests show that the probe image is identified correctly for all people when applied to a test set of 30 depth maps of 6 different people.

Coombes et al [A. M. Coombes, R. Richards, A. Linney, V. Bruce, R. Fright. *Description and recognition of faces from 3D data. Proc. of The-International Society for Optical Engineering.* Vol. 1766, (1992) 307-19] investigate a method based on differential geometry. Curvature analysis is applied to a depth map of the facial surface; segmenting the surface into one of eight fundamental types: peak, ridge, saddle ridge, minimal, pit, valley, saddle valley and flat. Coombes et al suggest that two faces may be distinguished by comparing which curve types classification of correlating regions. A quantitative analysis of the average male and female face structure shows distinct differences in chin, nose, forehead shape and cheek bone position between faces of different gender.

Another method, proposed by Gordon [supra], incorporates feature localisation. Using both depth and curvature information extracted from three-dimensional face models, Gordon identifies a number of facial features, from which a set of measurements are taken, including head width, numerous nose dimensions and curvatures, distance between the eyes and eye width. These features are evaluated using Fisher's Linear Discriminant, determining the discriminating ability of each individual feature. Gordon's findings show that the head width and nose location are particularly important features for recognition, whereas eye widths and nose curvatures are less useful. Recognition is performed by means of a simple Euclidean distance measure in feature space. Several combinations of features are tested using a database of 24 facial surfaces taken from 8 different people, producing results ranging from 70.8% to 100% correct matches.

As mentioned previously, there is little three-dimensional face data publicly available at present and nothing towards the magnitude of data required for development and testing of three-dimensional face recognition systems. Therefore, we have collected a new database of 3D face models, collected at UofY/Cybula as part of an ongoing project to provide a publicly available 3D Face Database of over 1000 people for face recognition research. The 3D face models are generated using a stereo vision technique enhanced by light projection to provide a higher density of features. Each face model requires a single shot taken with a 3D camera, from which the model is generated in sub-second processing time.

For the purpose of this evaluation, we use a subset of the 3D face database, acquired during preliminary data acquisition sessions. This set consists of 330 face models taken from 100 different people under the conditions shown in FIG. 5.

During capture, no effort was made to control lighting conditions. In order to generate face models at various head orientations, subjects were asked to face reference points positioned roughly 45 degrees above and below the camera, but no effort was made to enforce a precise angle of orientation. Examples of the face models generated for each person are shown in FIG. 5.

3D face models are stored in the OBJ file format (a common representation of 3D data) and orientated to face directly forwards using an orientation normalisation algorithm (not described here) before being converted into depth maps. The database is then separated into two disjoint sets: the training set consisting of 40 depth maps of type 01 (see FIG. 5) and a test set of the remaining 290 depth maps, consisting of all capture conditions shown in FIG. 5. Both the training set and test set contain subjects of various race, age and gender and nobody is present in both the training and test sets.

It is well known that the use of image processing techniques can significantly reduce error rates of two-dimensional face recognition methods, by removing unwanted features caused by environmental capture conditions. Much of this environmental influence is not present in the 3D face models, but pre-processing may still aid recognition by making distinguishing features more explicit. In this section we describe a number of surface representations, which may affect recognition error rates. These surfaces are derived by pre-processing of depth maps, prior to both training and test procedures, as shown in FIG. 8.

In our approach we define a '3D surface space' by application of principal component analysis to the training set of facial surfaces, taking a similar approach to that described by Turk and Pentland [supra] and used in previous investigations.

Consider our training set of facial surfaces, stored as orientation normalised 60×105 depth maps. Each of these depth maps can be represented as a vector of 6300 elements, describing a single point within the 6300 dimensional space of all possible depth maps. What's more, faces with a similar geometric structure should occupy points in a comparatively localised region of this high dimensional space. Continuing this idea, we assume that different depth maps of the same face project to nearby points in space and depth maps of different faces project to far apart points. Ideally, we wish to extract the region of this space that contains facial surfaces, reduce the dimensionality to a practical value, while maximising the spread of facial surfaces within the depth map subspace.

In order to define a space with the properties mentioned above, we apply principal component analysis to the training set of M depth maps (in our case M=40) $\{\Gamma_1, \Gamma_2, \Gamma_3, \ldots \Gamma_M\}$, computing the covariance matrix, $$C = \frac{1}{M}\sum_{n=1}^{M}\Phi_n\Phi_n^T \quad (1)$$
$$= AA^T$$
$$A = [\Phi_1\Phi_2\Phi_3 \ldots \Phi_M]$$
$$\Phi_n = \Gamma_n - \Psi$$
$$\Psi = \frac{1}{M}\sum_{n=1}^{M}\Gamma_n$$

Where $\Phi_n$ is the difference of the nth depth map from the average $\Psi$. Eigenvectors and eigenvalues of the covariance matrix are calculated using standard linear methods. The resultant eigenvectors describe a set of axes within the depth map space, along which most variance occurs within the training set and the corresponding eigenvalues represent the degree of this variance along each axis. The M eigenvectors are sorted in order of descending eigenvalues and the M' greatest eigenvectors (in our system M'=40) are chosen to represent surface space. The effect is that we have reduced the dimensionality of the space to M', yet maintained a high level of variance between facial surfaces throughout the depth map subspace.

We term each eigenvector an eigensurface, containing 6300 elements (the number of depth values in the original depth maps) which can be displayed as range images of the facial surface principal components, shown in FIG. 7.

Once surface space has been defined we project any face into surface space by a simple matrix multiplication using the eigenvectors calculated from the covariance matrix in equation 1:

$$\omega_k = u_k^T(\Gamma - \omega) \text{ for } k=1 \ldots M'. \quad (2)$$

where $u_k$ is the kth eigenvector and $\omega_k$ is the kth weight in the vector $\Omega^T = [\omega_1, \omega_2, \omega_3, \ldots \omega_{M'}]$. The M' coefficients represent the contribution of each respective eigensurface to the projected depth map. The vector $\Omega$ is taken as the 'face-key' representing a person's facial structure in surface space and compared by either euclidean or cosine distance metrics.

$$d_{euclidean} = \|\Omega_a - \Omega_b\| \quad (3)$$

$$d_{cosine} = 1 - \frac{\Omega_a^T \Omega_b}{\|\Omega_a\| \|\Omega_b\|}.$$

In addition, we can also divide each face-key by its respective eigenvalues, prior to distance calculation, removing any inherent dimensional bias and introducing two supplementary metrics, the mahalanobis distance and weighted cosine distance. An acceptance (the two facial surfaces match) or rejection (the two surfaces do not match) is determined by applying a threshold to the calculated distance. Any comparison producing a distance below the threshold is considered an acceptance. In order to evaluate the effectiveness of the face recognition methods, we carry out 41,905 verification operations on the test set of 290 facial surfaces, computing the error rates produced (see FIG. 8). Each surface in the test set is compared with every other surface, no image is compared with itself and each pair is compared only once (the relationship is symmetric).

False acceptance rates and false rejection rates are calculated as the percentage of incorrect acceptances and incorrect rejections after applying the threshold. Applying a range of thresholds produces a series of FAR, FRR pairs, which are plotted on a graph as shown for our benchmark system in FIG. 9. The Equal Error Rate can be seen as the point where FAR equals FRR.

We now present the results gathered from testing the three-dimensional face recognition methods on the test set of 290 facial surfaces. The results are presented by error curves of FAR vs. FRR and bar charts of EERs. FIG. 8 shows the error curve calculated for the baseline system (facial surface depth maps) using the four distance measures described earlier.

The results clearly show that dividing by eigenvalues to normalise vector dimensions prior to calculating distance values significantly decreases error rates for both the Euclidean and cosine distance measures, with the Mahalanobis distance providing the lowest EER. The same four curves were produced for all surface representations and the EERs taken as a single comparative value, presented in FIG. 11.

It is clear from the EERs shown in FIG. 11, that surface gradient representations provide the most distinguishing information for face recognition. The horizontal derivatives give the lowest error rates of all, using the weighted cosine distance metric. In fact, the weighted cosine distance returns the lowest error rates for the majority of surface representations, except for a few cases when the weighted cosine EER is particularly high. However, which is the most effective surface representation seems to be dependent on the distance metric used for comparison (see FIG. 10), except for curvature representations, which are generally less distinguishing, regardless of the distance metric used.

Due to the orthogonal nature of the most effective surface representations (horizontal and vertical derivatives), we hypothesize that combing these representations will reduce error rates further. Therefore, in addition to the methods used in FIG. 11, we test a number of system combinations by concatenating the face-keys projected from numerous surface spaces, attempting to utilise distinguishing features from multiple surface representations. The results for which are shown in Table 1, calculated by applying the weighted cosine distance measure to the extended face-keys combinations.

TABLE 1

Equal error rates of surface space combination systems

| Surface Space Combinations | EER |
| --- | --- |
| Sobel X, Sobel Y, Horizontal gradient large, vertical gradient | 12.1% |
| Laplacian, Horizontal gradient large, vertical gradient large | 11.6% |
| Laplacian, Sobel X, Horizontal gradient, Horizontal gradient large, vertical gradient, vertical gradient large | 11.4% |

We have shown that a well-known two-dimensional face recognition method can be adapted for use on three-dimensional face models. Tests have been carried out on a large database of three-dimensional facial surfaces, captured under conditions that present typical difficulties when performing recognition. The error rates produced from baseline three-dimensional systems are significantly lower that those gathered in similar experiments using two-dimensional images. It is clear that three-dimensional face recognition has distinct advantages over conventional two-dimensional approaches.

Working with a number of surface representations, we have discovered that facial surface gradient is more effective for recognition than depth and curvature representations. In particular, horizontal gradients produce the lowest error rates. This seems to indicate that horizontal derivatives provide more discriminatory information than vertical profiles. Another advantage is that gradients are likely to be more robust to inaccuracies in the alignment procedure, as the derivatives will be invariant to translations along the Z-axis.

Curvature representations do not seem to contain as much discriminatory information as the other surface representations. We find this surprising, as second derivatives should be less sensitive to inaccuracies of orientation and translation along the Z-axis. However, this could be a reflection of inadequate 3D model resolution, which could be the cause of the noisy curvature images in FIG. 12.

Testing three distance metrics has shown that the choice of method for face-key comparisons has a considerable affect on the resulting error rates. It is also evident that dividing each face-key by its respective eigenvalues, normalising dimensional distribution, usually improves results for both Euclidean and cosine distances. This indicates that dimensional distribution is not necessarily proportional to discriminating ability and that surface space as a whole becomes more discriminative when distributed evenly. However, this is not the case for some of surface representations with higher EERs, suggesting that these representations incorporate only a few dominant useful components, which become masked when normalised with the majority of less discriminatory components.

The weighted cosine distance produces the lowest error rates for the majority of surface representations, including the optimum system. This metric has also provided the means to combine multiple face-keys, in an attempt to utilise advantages offered by numerous surfaces representations, reducing error rates further.

We have managed to reduce error rates from 17.8% EER, obtained using the initial depth maps, to an EER of 12.1% when the most effective surface representations were combined into a single system. These results are substantially lower than the best two-dimensional systems tested under similar circumstances in our previous investigations, proving that geometric face structure is useful for recognition when used independently from colour and texture information and capable of achieving high levels of accuracy. Given that the data capture method produces face models invariant to lighting conditions and provides the ability to recognise faces regardless of pose, makes this system particularly attractive for use in security and surveillance applications.

We now turn to the examples of FIG. 13 to 18.

Previous work [Beumier, C., Acheroy, M.: *Automatic 3D Face Authentication. Image and Vision Computing*, Vol. 18, No. 4, (2000) 315-321], [Gordon, G.: Face *Recognition Based on Depth and Curvature Features. In Proc. of the IEEE Computer Society Conference on Computer Vision and Pattern Recognition*, Champaign, Ill. (1992) 108-110], [Chua, C., Han, F., Ho, T.: 3*D Human Face Recognition Using Point Signature. Proc. Fourth IEEE International Conference on Automatic Face and Gesture Recognition*, (2000) 233-8], [Zhao, W., Chellaa, R.: 3*D Model Enhanced Face Recognition. In Proc. Of the International Conference on Image Processing*, Vancouver (2000)], [Romdhani, S., Blanz, V., Vetter, T: *Face Identification by Fitting a 3D Morphable Model using linear Shape and Texture Error Functions. The European Conference on Computer Vision* (2002)], [Blanz V., Romdhani, S., Vetter, T.: *Face Identification across Different Poses and Illuminations with a 3D Morphable Model. In Proc. of the 5$^{th}$ IEEE Conference on AFGR* (2002)], [Beumier, C., Acheroy, M.: *Automatic Face Verification from 3D And Grey Level Clues*. 11*th Portuguese Conference on Pattern Recognition*, 2000] has shown that the use of 3D face models is able to overcome some of the problems associated with 2D face recognition. Firstly, by relying on geometric shape, rather than colour and texture information, systems become invariant to lighting conditions. Secondly, the ability to rotate a facial structure in three-dimensional space, allowing for compensation of variations in pose, aids those methods requiring alignment prior to recognition. Finally, the additional discriminatory information available in the facial surface structure, not available from two-dimensional images, provides additional cues for recognition.

It is to be appreciated, nevertheless, that 2D data could be used in addition to 3D data—or as an alternative.

It has also been shown that the use of pre-processing techniques applied prior to training and recognition, in which distinguishing features are made more explicit, environmental effects are normalised and noise content is reduced, can significantly improve recognition accuracy [Heseltine, T., Pears, N., Austin, J.: *Evaluation of image preprocessing techniques for eigenface-based face recognition. In Proc. of the 2nd International Conf. on Image and Graphics, SPIE* Vol. 4875 (2002) 677-685]. However, the focus of previous research has been on identifying the optimum surface representation, with little regard for the advantages offered by each individual surface representation. We suggest that different surface representations may be specifically suited to different capture conditions or certain facial characteristics, despite having a general weakness for overall recognition. For example, curvature representations may aid recognition by making the system more robust to inaccuracies in 3D orientation, yet be highly sensitive to noise. Another representation may enhance nose shape, but lose the relative positions of facial features. The benefit of using multiple eigenspaces has previously been examined by Pentland et al [A. Pentland, B. Moghaddom, T Starner, "*View-Based and Modular Eigenfaces for Face Recognition*", *Proc. of IEEE Conf. on Computer Vision and Pattern Recognition*, 1994], in which specialist eigenspaces were constructed for various facial orientations and local facial regions, from which cumulative match scores were able to reduce error rates. Our approach in this example differs in that we extract and combine individual dimensions, creating a single unified surface space. This approach has been shown to work effectively when applied to two-dimensional images.

Here we analyse and evaluate a range of 3D face recognition systems, each utilising a different surface representation of the facial structure, in an attempt to identify and isolate the advantages offered by each representation. Focusing on the fishersurface method of face recognition, we propose a means of selecting and extracting components from the surface subspace produced by each system, such that they may be combined into a unified surface space.

Prior to training and testing, 3D face models are converted into one of the surface representations shown in FIG. 13. This is done by firstly orientating the 3D face model to face directly forwards, then projecting into a depth map. The surfaces in the table of FIG. 13 are then derived by pre-processing of depth maps.

We give here a brief explanation of the fisherface method of face recognition, as described by Belhumeur et al [Belhumeur, J. Hespanha, D. Kriegman, "*Eigenfaces vs. Fishfaces: Face Recognition using class specific linear projection*", *Proc. of the European Conference on Computer Vision*, pp. 45-58, 1996] and how it is applied to three-dimensional face surfaces, termed the fishersurface method. We apply both Principal Component Analysis and Linear Discriminant Analysis to surface representations of 3D face models, producing a subspace projection matrix, similar to that used in the eigenface [A Pentland, B. Moghaddom, T Starner, "*View-Based and Modular Eigenfaces for Face Recognition*", *Proc. of IEEE Conf. on Computer Vision and Pattern Recognition*, 1994] and eigensurface methods. However, the fishersurface method is able to take advantage of 'within-class' information, minimising variation between multiple face models of the same person, yet still maximising class separation. To accomplish this, we expand the training set to contain multiple examples of each subject, describing the variance of a person's face structure (due to influences such as facial expression and head orientation), from one face model to another, as shown in equation 4.

$$\text{Training Set} = \begin{Bmatrix} \underbrace{\Gamma_1, \Gamma_2, \Gamma_3, \Gamma_4,}_{X_1} \\ \underbrace{\Gamma_5, \Gamma_6, \Gamma_7, \Gamma_8,}_{X_2} \\ \underbrace{\Gamma_9, \Gamma_{10}, \Gamma_{11},}_{X_3} \\ \underbrace{\Gamma_{12}, \Gamma_{13},}_{X_4} \ldots \underbrace{\Gamma_M}_{X_C} \end{Bmatrix} \quad (4)$$

Where $\Gamma_i$ is a facial surface and the training set is partitioned into c classes, such that each surface in each class $X_i$ is of the same person and no single person is present in more than one class. We continue by computing three scatter matrices, representing the within-class ($S_w$), between-class ($S_B$) and total ($S_T$) distribution of the training set throughout surface space, shown in equation 5.

$$S_T = \sum_{n=1}^{M}(\Gamma_n - \Psi)(\Gamma_n - \Psi)^T \quad (5)$$

$$S_B = \sum_{i=1}^{c}|X_i|(\Psi_i - \Psi)(\Psi_i - \Psi)^T$$

$$S_W = \sum_{i=1}^{c}\sum_{\Gamma_k \in X_i}(\Gamma_k - \Psi_i)(\Gamma_k - \Psi_i)^T$$

Where $$\Psi = \frac{1}{M}\sum_{n=1}^{M}\Gamma_n$$

is the average surface of the entire training set, and $$\Psi_i = \frac{1}{|X_i|}\sum_{\Gamma_i \in X_i}\Gamma_i,$$

the average of class $X_i$. By performing PCA using the total scatter matrix $S_T$, and taking the top M-c principal components, we produce a projection matrix $U_{pca}$, used to reduce dimensionality of the within-class scatter matrix, ensuring it is non-singular before computing the top c−1 (in this case 49) eigenvectors of the reduced scatter matrix ratio, $U_{fld}$ as shown in equation 6.

$$U_{fld} = \underset{U}{\text{argmax}}\left(\frac{|U^T U_{pca}^T S_B U_{pca} U|}{|U^T U_{pca}^T S_W U_{pca} U|}\right) \quad (6)$$

Finally, the matrix $U_{ff}$ is calculated as shown in equation 7, such that it may project a face surface into a reduced surface space of c−1 dimensions, in which the between-class scatter is maximised for all c classes, while the within-class scatter is minimised for each class $X_i$.

$$U_{ff} = U_{fld}U_{pca} \quad (7)$$

Once the matrix $U_{ff}$ has been constructed it is used in much the same way as the projection matrix in the eigenface and eigensurface systems, reducing dimensionality of face surface vectors from 5330 to just 49 (c−1) elements. Again, like the eigenface system, the components of the projection matrix can be viewed as images.

Once surface space has been defined, we project a facial surface into surface space by a simple matrix multiplication using the matrix $U_{ff}$, as shown in equation 8.

$$\omega_k = u_k^T(\Gamma - \Psi) \text{ for } k=1 \ldots c-1. \quad (8)$$

where $u_k$ is the kth eigenvector and $\omega_k$ is the kth weight in the vector $\Omega^T = [\omega_1, \omega_2, \omega_3, \ldots \omega_{M-1}]$. The c−1 coefficients represent the contribution of each respective fishersurface to the original facial surface structure. The vector $\Omega$ is taken as the 'face-key' representing a person's facial structure in reduced dimensionality surface space and compared using either euclidean or cosine distance metrics as shown in equation 9.

$$d_{euclidean} = \|\Omega_a - \Omega_b\| \quad (9)$$

$$d_{cosine} = 1 - \frac{\Omega_a^T \Omega_b}{\|\Omega_a\|\|\Omega_b\|}.$$

An acceptance (the two facial surfaces match) or rejection (the two surfaces do not match) is determined by applying a threshold to the distance calculated. Any comparison producing a distance value below the threshold is considered an acceptance.

Here we analyse the surface spaces produced when various facial surface representations are used with the fishersurface method. We begin by providing results showing the range of error rates produced when using various surface representations. FIG. 14 clearly shows that the choice of surface representation has a significant effect on the effectiveness of the fishersurface method, with horizontal gradient representations providing the lowest equal error rates (EER, the error when FAR equals FRR).

Figure 15:
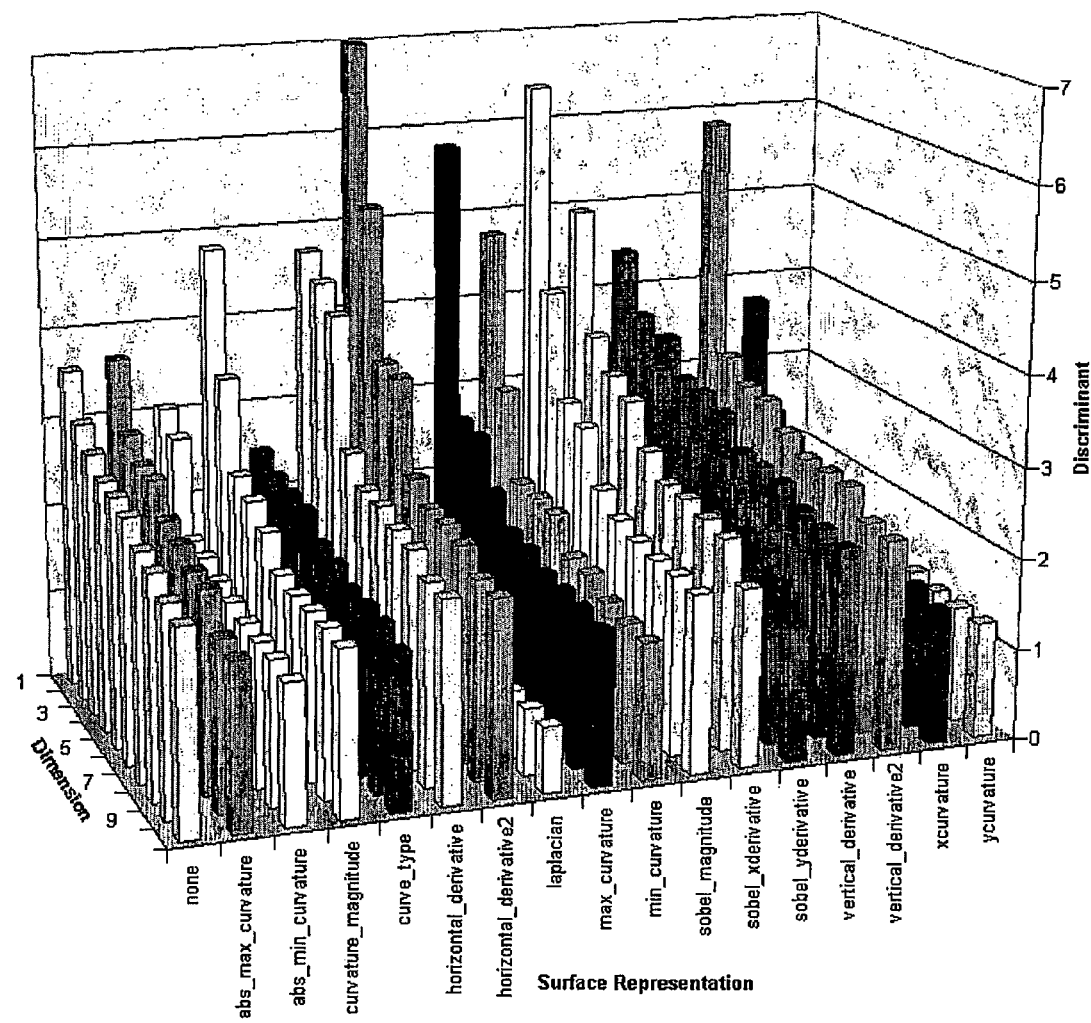
FIG. 15 is a graph showing discriminant values and dimensions for different surface representation.

However, the superiority of the horizontal gradient representations does not suggest that the vertical gradient and curvature representations are of no use whatsoever and although the discriminatory information provided by these representations may not be as robust and distinguishing, that is not to say they wouldn't make a positive contribution to the information already available in the horizontal gradient representations. We now carry out further investigation into the discriminating ability of each surface space by applying Fisher's Linear Discriminate (FLD), as used by Gordon [supra] to analyse 3D face features, to individual components (single dimensions) of each surface space. Focusing on a single face space dimension we calculate the discriminant d, describing the discriminating power of that dimension, between c people.

$$d = \frac{\sum_{i=1}^{c}(m_i - m)^2}{\sum_{i=1}^{c}\frac{1}{|\Phi_i|}\sum_{x \in \Phi_i}(x - m_i)^2}$$

Where m is the mean value of that dimension in the face-keys, $m_i$ the within-class mean of class i and $\Phi_i$, the set of vector elements taken from the face-keys of class i. Applying the above equation to the assortment of surface space systems generated using each facial surface representation, we see a wide range of discriminant values describing the distinguishing ability of each individual dimension, as shown in FIG. 15 for the top ten most discriminating dimensions for each surface representation.

It is clear that although some surface representations do not perform well in the face recognition tests, producing high EERs (for example min_curvature), some of their face-key components do contain highly discriminatory information. We hypothesise that the reason for these highly discriminating anomalies, in an otherwise ineffective subspace, is that a certain surface representation may be particularly suited to a single discriminating factor, such as nose shape or jaw structure, but is not effective when used as a more general classifier. Therefore, if we were able to isolate these few useful qualities from the more specialised subspaces, they could be used to make a positive contribution to a generally more effective surface space, reducing error rates further.

Here we describe how the analysis methods discussed in above are used to combine multiple face recognition systems. Firstly, we need to address the problem of prioritising surface space dimensions. Because the average magnitude and deviation of face-key vectors from a range of systems are likely to differ by some orders of magnitude, certain dimensions will have a greater influence than others, even if the discriminating abilities are evenly matched. To compensate for this effect, we normalise moments by dividing each face-key element by its within-class standard deviation. However, in normalising these dimensions we have also removed any prioritisation, such that all face space components are considered equal. Although not a problem when applied to a single surface space, when combining multiple dimensions we would ideally wish to give greater precedence to the more reliable components. Otherwise the situation is likely to arise when a large number of less discriminating (but still useful) dimensions begin to outweigh the fewer more discriminating ones, diminishing their influence on the verification operation and hence increasing error rates. We showed how FLD could be used to measure the discriminating ability of a single dimension from any given face space. We now apply this discriminant value d as a weighting for each face space dimension, prioritising those dimensions with the highest discriminating ability.

With this weighting scheme applied to all face-keys produced by each system, we can begin to combine dimensions into a single unified surface space. In order to combine multiple dimensions from a range of surface spaces, we require some criterion to decide which dimensions to combine. It is not enough to rely purely on the discriminant value itself, as this only gives us an indication of the discriminating ability of that dimension alone, without any indication of whether the inclusion of this dimension would benefit the existing set of dimensions. If an existing surface space already provides a certain amount of discriminatory ability, it would be of little benefit (or could even be detrimental) if we were to introduce an additional dimension describing a feature already present within the existing set.

Investigations have used FLD, applied to a combined eigenspace in order to predict its effectiveness when used for recognition. Additional dimensions are then introduced if they result in a greater discriminant value. Such a method has been shown to produce an 2D eigenspace combination able to achieve significantly lower error rates in 2D face recognition, although it is noted that using the EER would likely provide better results, although processing time would be extremely long. However, with a more efficient combination algorithm we now take that approach, such that the criterion required for a new dimension to be introduced to an existing surface space is a resultant increase in the EER In practice, any optimisation method may be used to select the best combination of dimensions (such as genetic algorithms, simulated annealing etc.).

```
Combined surface space = first dimension of
current optimum system
Calculate EER of combined surface space
For each surface space system:
    For each dimension of surface space:
        Concatenate new dimension onto
    combined surface space
        Calculate EER of combined surface
space
        If EER has not increased:
            Remove new dimension from
        combined surface space
    Save combined surface space ready for evaluation
```

Figure 16:
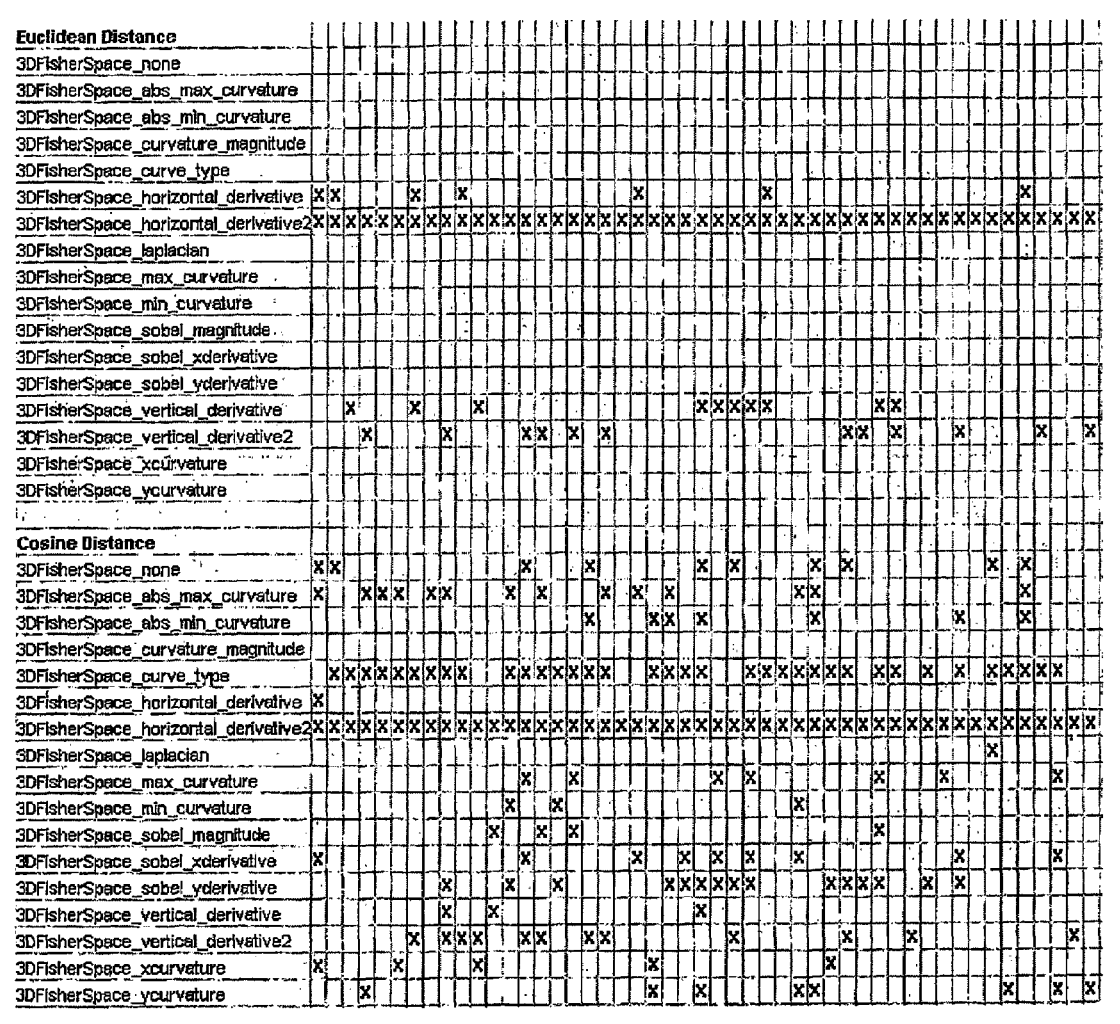

FIG. 16 shows which dimensions from which surface space were selected using the above algorithm, for inclusion in two combined systems: one using the euclidean distance metric and the other using the cosine distance metric.

We now compare the combined surface space systems with the optimum individual system, using both the cosine and euclidean distance measures.

Figure 17:
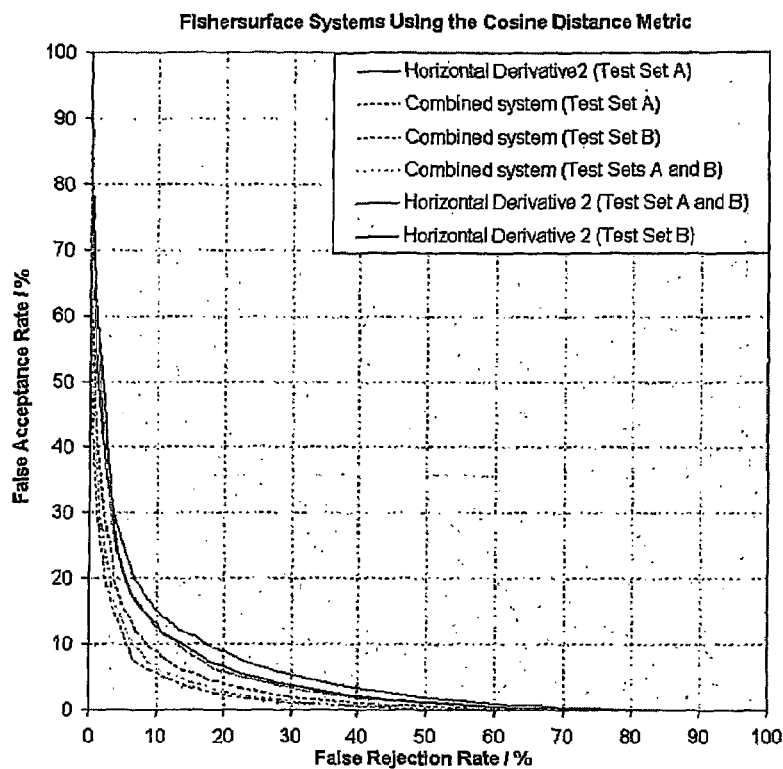
FIGS. 17 and 18 show error curves for fishersurface systems using cosine and Euclidean distance metrics.
Figure 18:
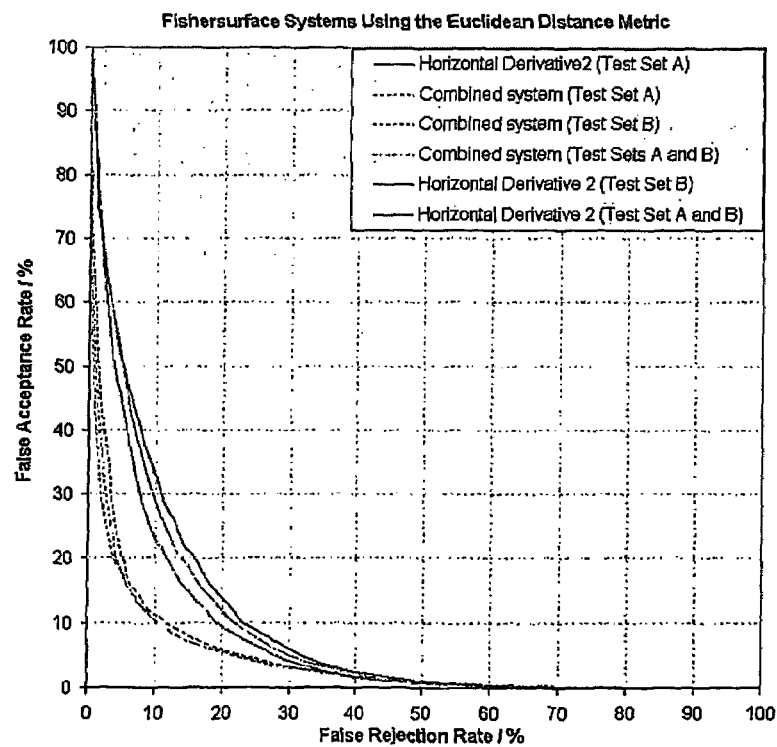

The error curves shown in FIGS. 17 and 18 illustrate the results obtained when the optimum single fishersurface system and combined fishersurface system are applied to test set A (used to construct the combined system), test set B (the unseen test set) and the full test set (all images from sets A and B) using the cosine and euclidean distance metrics. We see that the combined systems (dashed lines) do produce lower error rates than the single systems for both the cosine and Euclidean distance measure. The optimum system can be seen as the fishersurface combination using the cosine distance, producing an EER of 7.2% 9.3% and 8.2% for test set A, B and A and B respectively.

It is to be noted that this is just one example of selecting dimensions and can only determine a local maximum in performance in the neighborhood of the set of initial selected components which, in this case, is the selection of all of the horizontal derivative components. Other embodiments of the invention generally cover any search or optimisation method used to select a subset of the dimensions from the total set of dimensions in order to give an accurate and reliable system performance.

The various methods disclosed herein may be combined with one another.

As indicated above, although illustrated embodiments of the invention are used to recognise faces, they may be used or modified to recognise other objects.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all and any priority documents identified in connection with this application and to all and any papers and documents which are filed concurrently with or previous to this specification in connection with this application and which are open to public inspection with this specification, and the contents of all such papers and documents are incorporated herein by reference.

All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification, or to any novel one, or any novel combination, of the steps of any method or process so disclosed.

The invention claimed is:

1. A method of recognizing an image, comprising the steps of utilizing a computer or processor to:
   a. process the image to provide an image set containing a plurality of different processed images which are derived from the original image to be recognized;
   b. combine the processed images in the image set;
   c. transform the data space occupied by the processed images in the image set;
   d. generate, from the image-set represented in the transformed data space, an image key representative of the image; and
   e. compare the image key with at least one previously stored image key of a known image, to verify the identity of the image.

2. A method according to claim 1, wherein step a. includes extracting image features including at least one of edges, lines, wavelets, gradient components, curvature components and colour components.

3. A method according to claim 1, wherein step b. is carried out prior to step c.

4. A method according to claim 1, wherein step c. is carried out prior to step b.

5. A method according to claim 1, wherein step e. comprises comparing the image key with just one previously stored image key.

6. A method according to claim 1, wherein step e. comprises comparing the image key wit a plurality of previously stored image keys, to identify the image.

7. A method according to claim 6, comprising the further step of sorting the results of the comparison in step e. to produce a list of potential matches with previously stored image keys.

8. A method according to claim 6, wherein step e. is carried out using a Euclidean distance metric (the L2 norm), mahalanobis distance metric or a cosine distance metric.

9. A method according to claim 1, including the step prior to step a. of rotating and/or positioning the image to a predetermined orientation and/or position and/or depth normalisation.

10. A method according to claim 1, including a step prior to step b. of normalising data prior to combination.

11. A method according to claim 1, wherein said image is obtained from a camera.

12. A method according to claim 1, wherein said image comprises 3D data.

13. A method according to claim 12, wherein said image comprises a registered 2D-3D image pair.

14. A method according to claim 1, wherein said image comprises 2D data.

15. A method according to claim 1, wherein step c. is carried out by a Principal Component Analysis method.

16. A method according to any of claims 1 to 13, wherein step is carried out by Fisher's Linear Discriminant Analysis method.

17. A method according to claim 1, wherein said image is an image of a face.

18. A method according to claim 1, wherein said image is an image of a human face.

19. A method according to claim 1, wherein said image is a natural image.

20. A method according to claim 1, wherein said image set includes the original image.

21. Apparatus for recognizing an image, the apparatus comprising:
   a. processing means arranged to process the image to provide a plurality of different processed images which are derived from the original image to be recognized;
   b. combining means arranged to combine the processed images;
   c. reducing means arranged to reduce the data space occupied by the processed images;
   d. generating means arranged to generate from the combined and reduced processed images an image key representative of the image; and
   e. comparison means arranged to compare the image key with at least one previously stored image key of a known image, to verify the identity of the image.

22. Apparatus according to claim 21, wherein said processing means is arranged to extract image features including at least one of edges, lines, wavelets, gradient components, curvature components and colour components.

23. Apparatus according to claim 21, wherein said reducing means is arranged to reduce said data space after said combining means combines said processed images.

24. Apparatus according to claim 21, wherein said reducing means is arranged to reduce said data space before said combining means combines said processed images.

25. Apparatus according to claim 21, wherein said comparison means is arranged to compare the image key with just one previously stored image key.

26. Apparatus according to claim 21, wherein said comparison means is arranged to compare the image key with a plurality of previously stored image keys, to identify the image.

27. Apparatus according to claim 26, further comprising sorting means arranged to sort results from said comparison means to produce a list of potential matches with previously stored image keys.

28. Apparatus according to claim 26, wherein said comparison means is arranged to carry out a comparison using a Euclidean distance metric (the L2 norm), mahalanobis distance metric or a cosine distance metric.

29. Apparatus according to claim 21, further comprising normalising means arranged to normalise data prior to combination of the data by said combination means.

30. Apparatus according to claim 21, further comprising a camera that is arranged to provide said image to be recognised.

31. Apparatus according to claim 21, arranged to process 3D image data.

32. Apparatus according to claim 21, arranged to process 2D image data.

33. Apparatus according to claim 21, arranged to process an image that comprises a registered 2D-3D image pair.

34. Apparatus according to claim 21, wherein said reducing means is arrange to carry out a Principal Component Analysis method.

35. Apparatus according to claim 21, wherein said reducing means is arrange to carry out a Fisher's Linear Discriminant Analysis method.

36. Apparatus according to claim 21, arranged to process an image of a face.

37. Apparatus according to claim 21, arranged to process an image of a human face.

38. Apparatus according to claim 21, arranged to process a natural image.

39. Apparatus according to claim 21, wherein one of said processed images includes the original image.

40. A method of recognizing an image, comprising the steps of utilizing a computer or processor to:
 a. transform the data space occupied by a three dimensional image using Fisher's Linear Discriminant Analysis;
 b. generate, from the transformed data space, an image key representative of the image; and
 c. compare the image key with at least one previously stored image key of a known image, to verify the identity of the image.

41. Apparatus for recognizing a three-dimensional image, the apparatus comprising:
 a. means for transforming the data space occupied by a three dimensional image using Fisher's Linear Discriminant Analysis;
 b. means for generating, from the transformed data space, an image key representative of the image; and
 c. means for comparing the image key with at least one previously stored image key of a known image, to verify the identity of the image.

* * * * *